Aug. 3, 1965   F. J. FONTANA ETAL   3,197,802
UNIVERSAL SOCKET ADAPTOR
Filed May 4, 1962
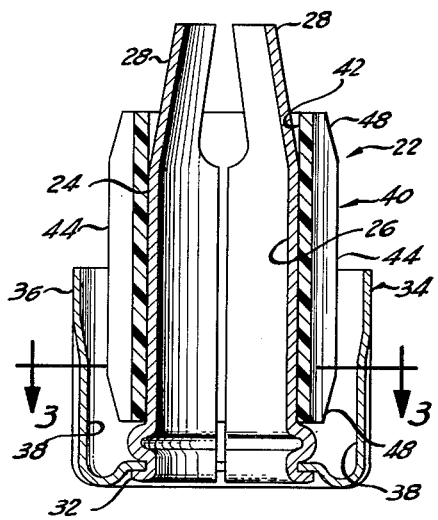
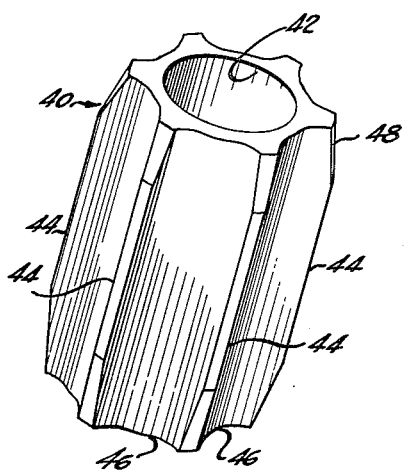
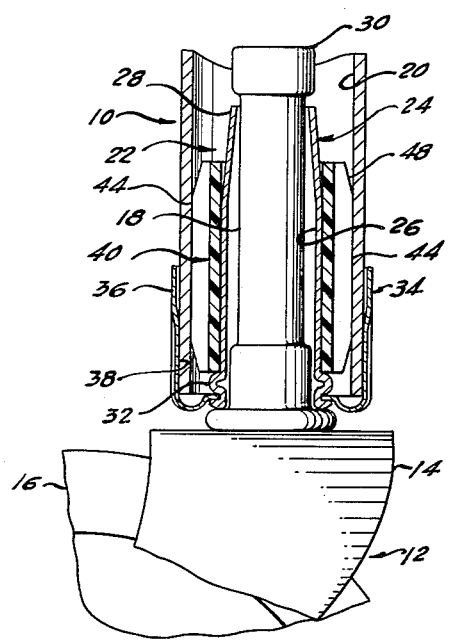
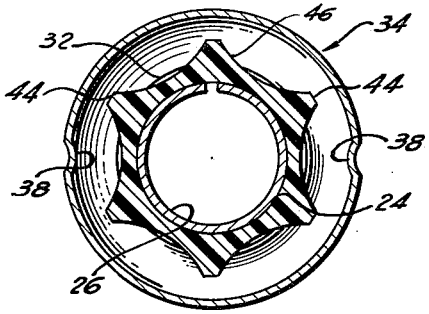
INVENTORS
Frank J. Fontana
Michael Kramcsak, Jr.
By A. G. Douvas
Attorney

United States Patent Office 3,197,802
Patented Aug. 3, 1965

3,197,802
UNIVERSAL SOCKET ADAPTOR
Frank J. Fontana and Michael Kramcsak, Jr., Bridgeport, Conn., assignors to Stewart-Warner Corporation, a corporation of Virginia
Filed May 4, 1962, Ser. No. 192,385
7 Claims. (Cl. 16—43)

This invention relates to caster mounting structure including a caster socket, and in particular, to a universal adaptor operable to fix the caster socket to a supported article within a receiving opening therein which can be of slightly varying internal dimensions.

In many caster applications, the pintle of a caster is received within a socket carried by the supported article on the underside of the article. A typical application is that in which the socket is secured within the lower open end of a tubular leg. Frequently, the internal dimensions of the leg opening vary slightly, either intentionally by varying the gauge thickness, or unintentionally because of wear of or imperfections on the periphery of the opening. This creates an inventory problem in adapting a single sized socket to the many varying internally sized socket receiving openings which commonly exist in the commercial areas where casters are used.

Accordingly, an object of this invention is to provide improved socket adaptor structure operable to secure a caster socket fixedly to the supported article within a receiving opening therein.

Another object of this invention is to provide a universal socket adaptor for securing a caster socket to any of a plurality of varying internally sized tubular legs.

In order that these objects can be more fully appreciated, reference is herein made to the following specification and accompanying drawing forming a part thereof, wherein:

FIG. 1 is a longitudinal cross-sectional view of the subject universal adaptor socket shown in assembled relationship with a tubular leg and a caster;

FIG. 2 is an enlarged view, similar to FIG. 1, of the universal adaptor socket of the subject invention;

FIG. 3 is a section view as seen generally from line 3—3 of FIG. 2;

FIG. 4 is a perspective view of a spacer element used in the subject invention.

Referring now to FIG. 1 of the drawing, the lower open end of a tubular leg 10 is shown which is part of or secured to the supported article (not shown). A caster 12 includes a frame 14 having rotatably secured thereto on bearing structure (not shown) a caster wheel 16 operable to roll on the supporting surface as is well known in the art. The caster 12 further includes a pintle 18 which extends into a socket receiving opening 20 within the leg 10 and is supported therein relative to the leg by socket assembly 22.

The socket assembly 22, in the embodiment shown, includes a metal caster socket 24 rolled from a plate to define a generally cylindrical bore 26. The upper end of the socket has inwardly directed spring fingers 28 which flexibly retain head 30 at the upper end of pintle 18. The socket 24 is curled at its lower end 32 within a bore of a cup retainer 34 and is fixed to the cup. The retainer cup 34 has side wall 36 of inner dimension comparable to the exterior dimension of the leg 10 and is received snugly over the lower end of the tubular leg 10. The side wall 36 is fluted inwardly at several places as to 38 to provide spaced contacts with the leg 10.

A spacer 40 is interposed between the socket 24 and leg 10 adapted to secure the socket to the leg. The spacer 40 has an elongated body structure having a centerbore 42 adapted to receive snugly the socket 24. The outer periphery of spacer 40 is slightly larger than the interior opening 20 of leg 10. In the embodiment shown, the outer periphery is defined by a plurality of separate longitudinal ribs 44 interconnected by generous fillets or arcuate wall sections 46 to the main portion of the body. These arcuate wall sections will provide a buttressing force when the spacer is forced into a furniture leg to aid in preventing distortion of the circumferential wall. The ends of each rib 44 are tapered inwardly slightly as at 48 adapted to fit freely initially inside receiving opening 20. The spacer 40 is fabricated of a plastic material which is slightly compressible or shearbale, such as nylon or styron.

To assemble the socket structure 22, spacer 40 is snugly received over socket 24 to the position abutting the curl 32. The socket assembly 22 is fitted into receiving opening 20 with tapered ends 48 of the rib 44 initially guiding and seating the spacer therein. After the oversized spacer ribs 44 bind on the supported structure 10, increased inward applying force on the assembly will cause the excess periphery of the ribs to give way, thereby allowing further insertion into the opening. When the leg 10 is received within the cup 34, a sharp impact blow, such as from a hammer, on the underside of the cup directs the socket structure 22 inwardly to its secured position as shown in FIG. 1.

In the finally secured position, spacer 40 is wedged between the side walls of the leg 10 and socket 24. Since the ribs 44 are of narrow confines relative to the entire possible periphery of the spacer, excess radial structure of the ribs can be compressed slightly or sheared away by insertion into the receiving opening 20 to fit snugly therein. The radial compressive force of the ribs 44 binds the spacer to the leg 10 and socket 24 for frictionally securing them together. The cup 34 confining possible radial expansion of the leg by the wedging spacer ribs 44 further causes a securing friction force of the socket assembly 22 to the leg 10. Thus the friction between the socket 24 and spacer 40, between the ribs 44 and leg 10, and between the leg 10 and cup 34 effectively secures the socket assembly 22 to the leg.

Once the socket assembly 22 is secured to the leg 10, the pintle 18 can be easily inserted into the socket 24 until head 30 passes the upper spring fingers 28 of the socket. The spring fingers 28 retain the pintle within the socket, although a sufficiently large retracting force on the caster will force the spring fingers 24 apart to release the caster. This is possible by wedging a tool such as a screw driver between the frame 14 and the lower portion of cup 34 to pry the caster 12 from the socket. It is noted that the force holding the socket assembly to the leg is greater than the force of the spring fingers 28 retaining the pintle head 30.

While a specific embodiment of the subject invention has been shown it will be obvious to those skilled in the art that other modifications can be made therein without departing from the inventive concept. Accordingly, it is desired that the invention be limited only by the scope of the claims hereinafter following.

What is claimed is:

1. In a caster device having a pintle adapted to be connected to a supported device within a receiving opening therein, the improvement being a mounting arrangement for supporting the pintle to the supported device, comprising a socket having a bore for the pintle, means on the socket and pintle for retaining releasably the pintle within the bore, and a separate hollow plastic spacer having a bore extending therethrough and open at both ends defined by a circumferentially continuous wall for snugly receiving the socket and having an irregularly shaped outer periphery defined by a plurality of longitudinal ribs formed continuously with and integrally with said continuous wall and extending radially outwardly from the main body of the spacer and oversized as compared to the receiving opening of the supported device, operable with the socket positioned in said bore to be wedged into the receiving opening of the supported article so that the compressive force of the spacer against the socket and supported device operates to secure the socket frictionally to the supported device.

2. In a caster having a pintle adapted for connection to a tubular leg within a receiving opening therein, the improvement being a mounting arrangement for the pintle, comprising a socket having a bore for the pintle, means on the socket and the pintle for retaining releasably the pintle within the bore, a cup secured to the socket, said cup being open to the leg and of internal dimension immediately adjacent the open end slightly in excess of the exterior dimension of the leg and of internal dimension spaced from the open end slightly less than the exterior dimension of the leg, and a hollow plastic spacer having a through-bore defined by a circumferentially continuous wall received snugly over the socket and having an irregularly shaped outer periphery defined by a plurality of longitudinally extending spaced ribs formed integrally and continuously with said continuous wall and projecting from the main body of the spacer, said plastic spacer being received snugly over the socket and at least in part being directly opposite the cup so that the spacer and socket can be forced against the leg into the receiving opening with sufficient force to wedge the spacer between the leg and socket and to force the leg against the cup operable to secure frictionally the socket to the leg.

3. In a caster having a pintle adapted for connection to a tubular leg within a receiving opening therein, the improvement being a mounting arrangement for the pintle, comprising a socket having a bore for the pintle, means on the socket and the pintle for retaining releasably the pintle within the bore, a cup secured to the sokcet, said cup being open to the leg and of internal dimension immediately adjacent the open end slightly in excess of the exterior dimension of the leg and of internal dimension spaced from the open end slightly less than the exterior dimension of the leg, and a hollow plastic spacer having a through-bore received snugly over the socket and having an irregularly shaped outer periphery defined by a plurality of longitudinally extending spaced ribs projecting from the main body of the spacer, said plastic spacer being received snugly over the socket and at least in part being directly opposite the cup, and at least the end of the spacer being tapered at each of the ribs to an external dimension slightly less than the receiving opening so that the spacer and socket can be freely positioned within the receiving leg initially until at least some of the ribs engage the inner periphery of the receiving opening and thereafter can be forced against the leg with sufficient force to wedge the spacer between the leg and socket and to force the leg against the cup operable to secure frictionally the socket to the leg.

4. In a caster having a pintle adapted for connection to a tubular leg within a receiving opening therein, the improvement being a mounting arrangement for the pintle, comprising a socket having a bore for the pintle, means on the socket and the pintle for retaining releasably the pintle within the bore, a cup secured to the socket, said cup being open to the leg and of internal dimension immediately adjacent the open end slightly in excess of the exterior dimension of the leg and of internal dimension spaced from the open end comparable to or slightly less than the exterior dimension of the leg, and a hollow plastic spacer having a through-bore received snugly over the socket and having an irregularly shaped outer periphery defined by a plurality of longitudinally extending spaced ribs projecting from the main body of the spacer and interconnected by concave fillets of generous radius of curvature as compared to the height of the ribs, said plastic spacer being received snugly over a socket at least in part being directly opposite the cup to define with the cup an annular receiving space adapted to receive the tubular leg, and at least the end of the spacer being tapered at each of the ribs to an external dimension slightly less than the receiving opening so that the spacer and socket can be freely positioned within the receiving leg initially until at least some of the ribs engage the inner periphery of the receiving opening and thereafter can be forced against the leg with sufficient force to wedge the spacer between the leg and socket and to force the leg against the cup operable to secure frictionally the socket to the leg.

5. A spacer for use in seating the socket element of a caster in a furniture leg in order to fasten a caster pintle to said furniture leg, the improvement comprising a tubular plastic element having a bore extending therethrough and open at both ends defined by a continuous integral circumferential wall adapted to receive said socket element, a plurality of spaced apart longitudinally extending ribs on said tubular plastic element adapted to be compressed on insertion of said tubular plastic element and socket within said leg for frictionally engaging said spacer and socket within said leg, and an arcuate wall section on said tubular element extending between adjacent ribs for the purpose of avoiding distortion of the wall of said bore in response to said frictional engagement.

6. In combination with the spacer claimed in claim 5, a socket element comprising a split tube having an inwardly tapered annular portion adjacent its top and adapted to be radially displaced for enabling the movement of the enlarged head of a pintle therethrough, said tubular element terminating a sufficient distance below said top end of said tube to permit said annular portion to expand in response to the movement of said pintle head therethrough.

7. A spacer as claimed in claim 5, wherein said plurality of spaced apart longitudinally extending ribs have their largest radial diameter between the ends of said element and taper radially inwardly adjacent opposite ends of said spacer, whereby either the compression or shear of said ribs on insertion of said element within said leg is relieved at the lower end of said element in the space provided by said radially inwardly tapered ribs irrespective of which end of said element is first inserted in said leg.

References Cited by the Examiner

UNITED STATES PATENTS

| 2,072,132 | 3/37 | Scott et al. | 16—43 |
| 2,973,546 | 3/61 | Roche | 16—43 |
| 3,018,506 | 1/62 | Haydock | 16—20 |
| 3,038,194 | 6/62 | Arenson | 16—43 |

DONLEY J. STOCKING, *Primary Examiner.*